United States Patent

[11] 3,577,031

[72] Inventors Neil R. Welsh;
Richard E. McCormick, Dana Point, Calif.
[21] Appl. No. 839,240
[22] Filed July 7, 1969
[45] Patented May 4, 1971
[73] Assignee Telonic Industries, Inc.
Laguna Beach, Calif.

[54] MULTI-COLOR OSCILLOSCOPE
23 Claims, 27 Drawing Figs.
[52] U.S. Cl. .................................................. 315/13,
315/21, 315/22, 315/27, 315/30
[51] Int. Cl. ............................................. H01j 29/50,
H01j 29/52, H01j 29/72
[50] Field of Search .......................................... 315/13, 13
(CG), 13 (ST), 13 (C), 21, 22 (Orig), 30, 27

[56] References Cited
UNITED STATES PATENTS

| | | | |
|---|---|---|---|
| 2,449,339 | 9/1948 | Sziklai............................ | 315/13 |
| 2,691,162 | 10/1954 | Geer................................ | 343/6.5 |
| 3,163,797 | 12/1964 | Singleback...................... | (315/13C) |
| 3,382,400 | 5/1968 | Hart................................. | 315/13(C) |
| 3,404,309 | 10/1968 | Massell et al. ................. | 315/18 |
| 3,428,856 | 2/1969 | Jones............................... | 315/27 |

OTHER REFERENCES
" Single Scope Displays," Military Automation, Sept.—Oct. 1958, pp. 172— 173, copy in 343/112.

Primary Examiner—Rodney D. Bennett, Jr.
Assistant Examiner—Malcolm F. Hubler
Attorney—Fowler, Knobbe and Martens ABSTRACT: An oscilloscope employing a multibeam, multicolor cathode-ray tube in which each of several input signals are displayed in a different color on the cathode-ray tube screen. The electron beams are rapidly scanned along the vertical axis to produce a vertical raster. Plural horizontal reference lines are displayed in discrete colors simultaneously with the signal traces by displaying the reference lines and input signals as colored dots by individually intensity modulating the plural electron beams during their alternate up and down scans. Plural vertical reference lines are displayed in discrete colors simultaneously with the signal traces and the horizontal reference lines by energizing each of the beams for a single vertical trace at a predetermined position along the horizontal screen axis. Convergence circuits correct for both vertical and horizontal convergence, the horizontal convergence circuit being adapted to correct for convergence for differing horizontal drive waveforms. A vertical scan oscillator including a resonant circuit incorporating the vertical deflection coil provides a high frequency, high voltage scan without requiring large voltages across the amplification stage.

INVENTORS.
NEIL R. WELSH
RICHARD E. McCORMICK
BY
FOWLER, KNOBBE
& MARTENS
ATTORNEYS.

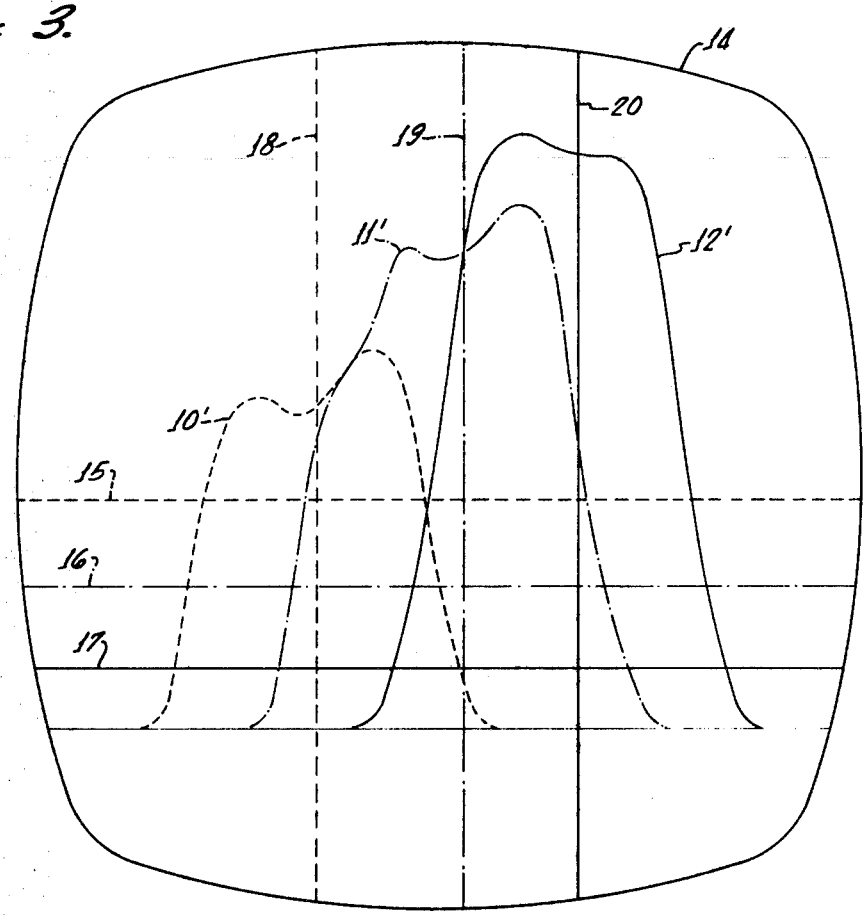

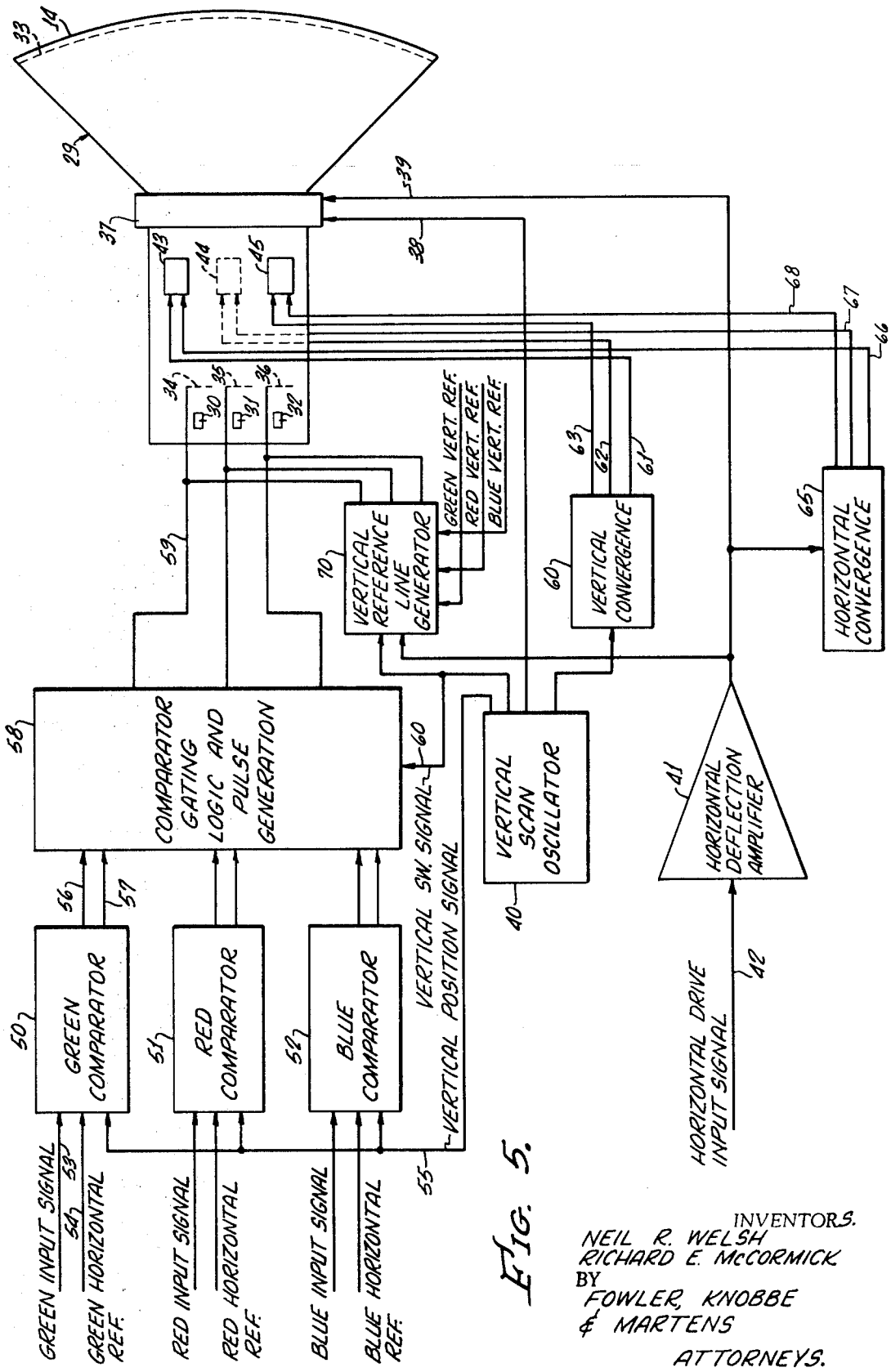

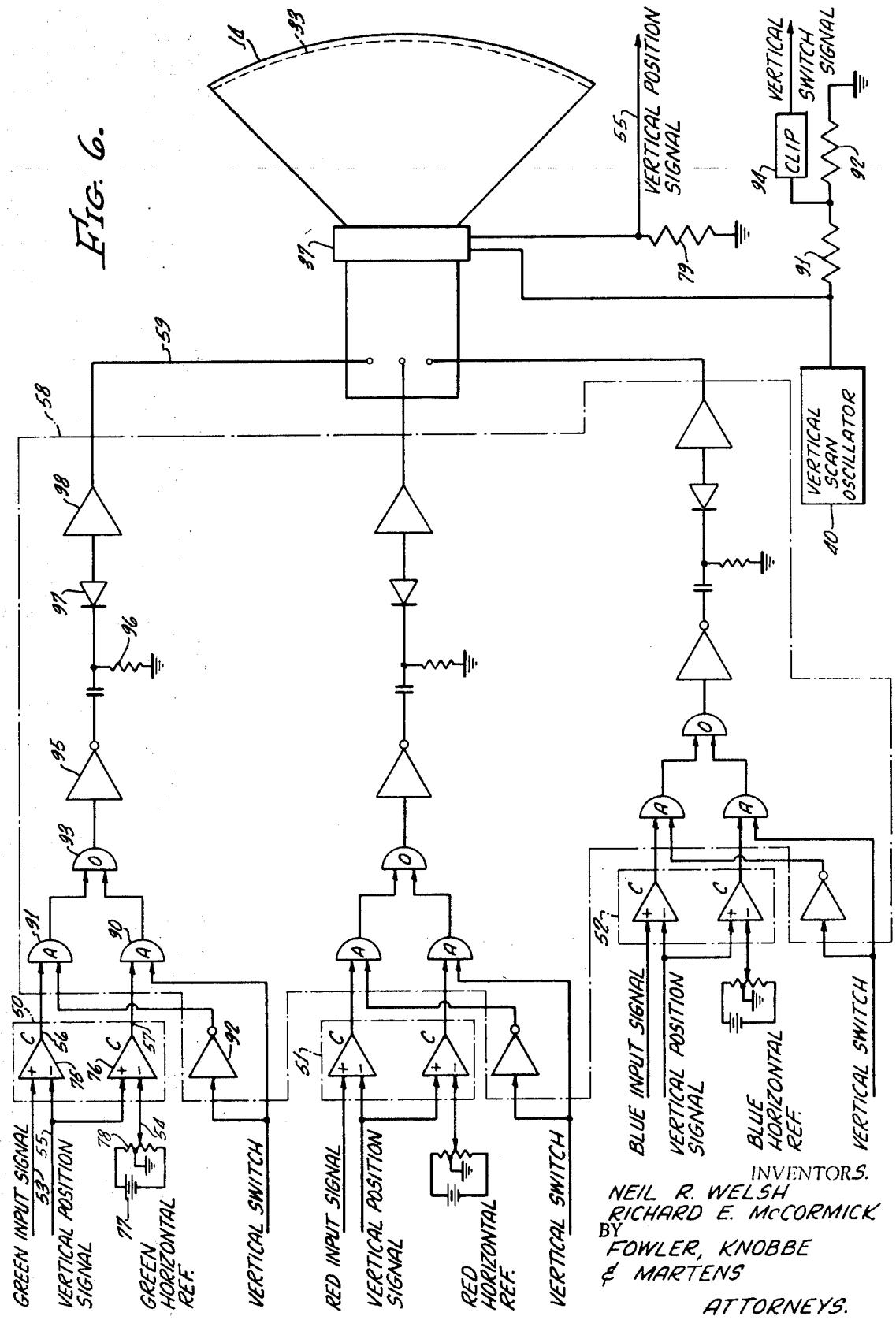

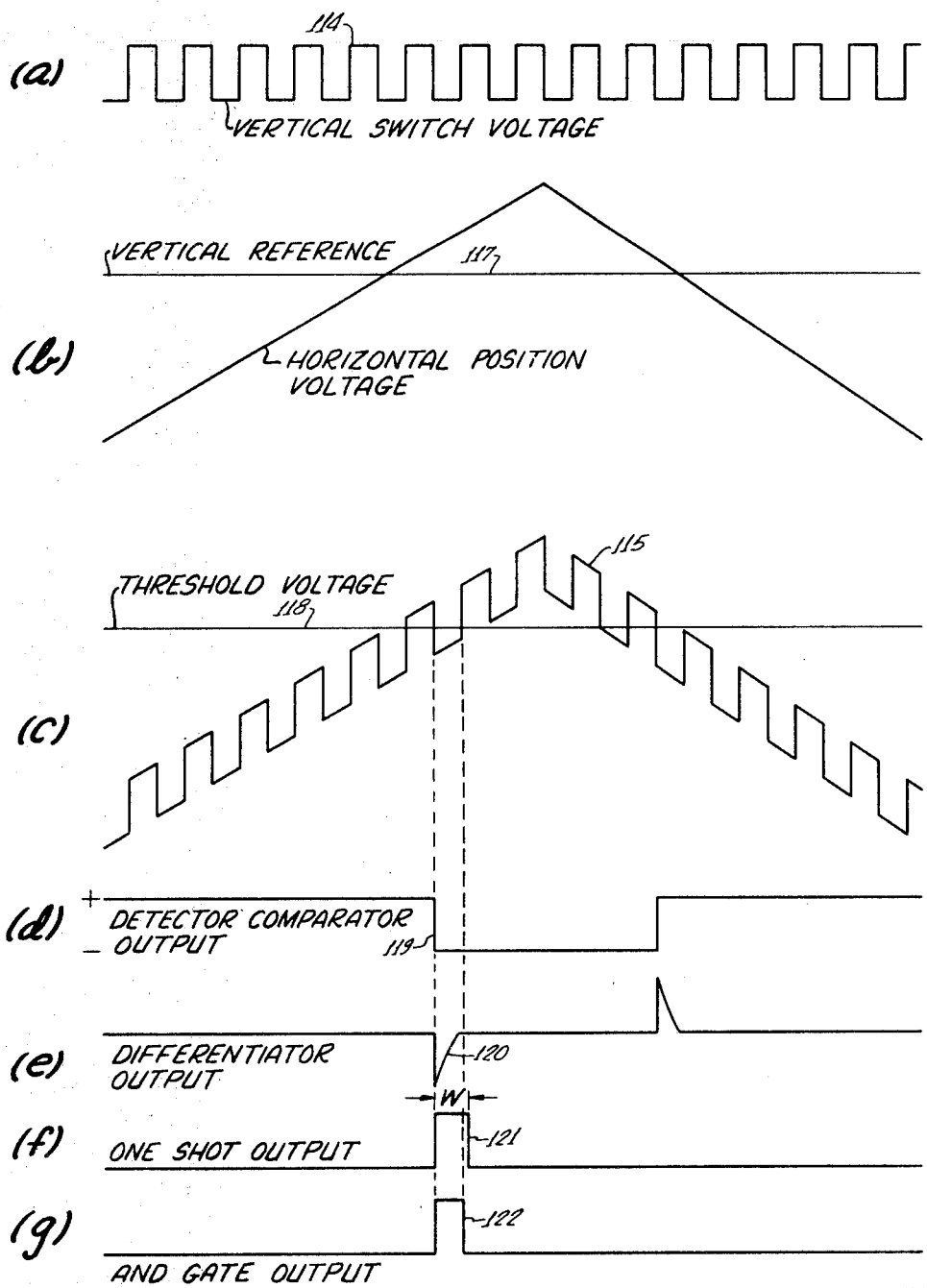

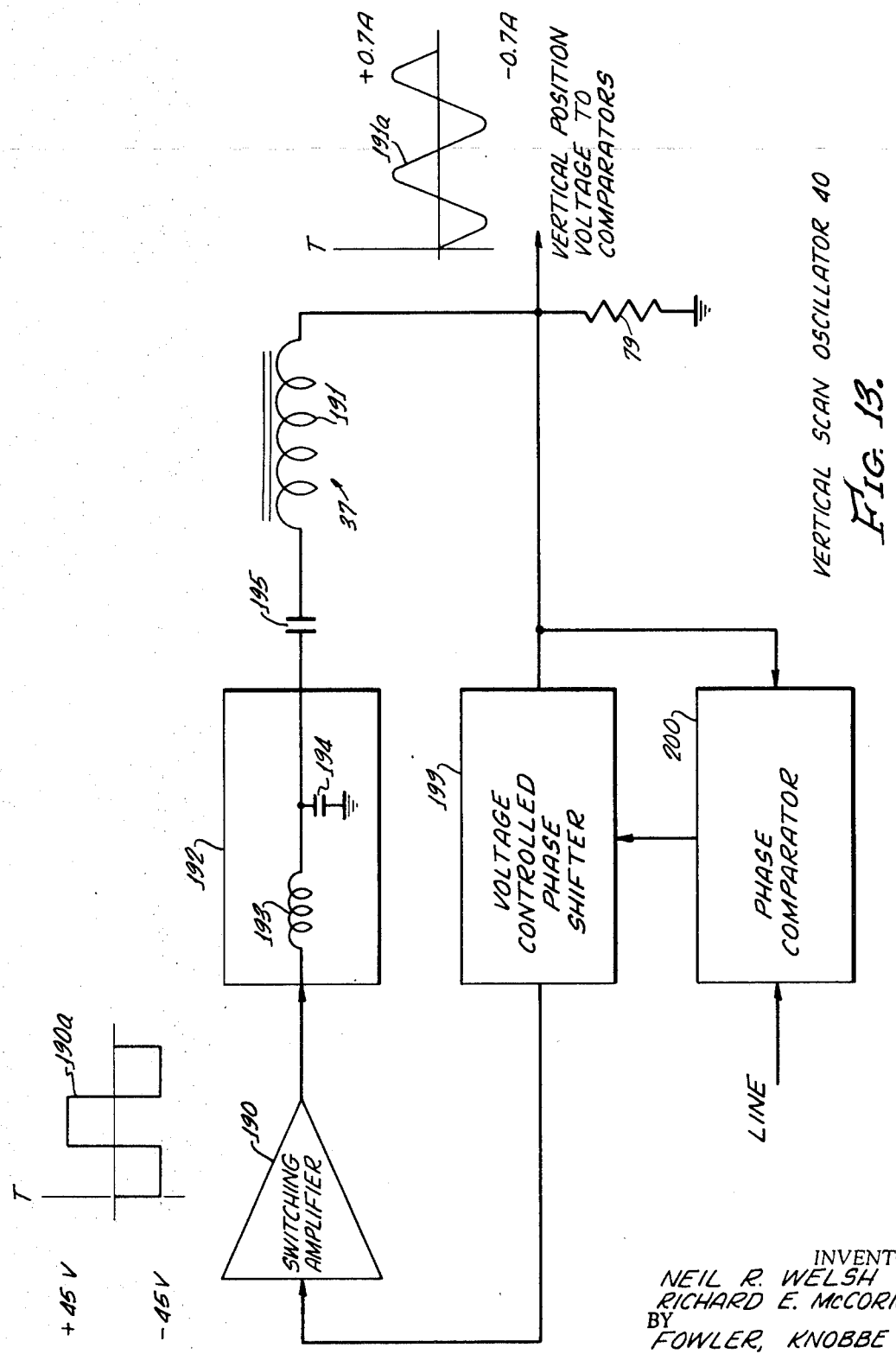

MULTI-COLOR OSCILLOSCOPE

BACKGROUND OF THE INVENTION

1. Field of the Invention

This invention relates to improvements in cathode-ray oscilloscopes.

2. Description of the Prior Art

Contemporary cathode-ray oscilloscopes are highly versatile and accurate. They are capable of providing clear, accurate and instantaneous displays of practically any electronic waveform, whether it can be fast or slow, strong or weak, transient or periodic. An important limitation, however, of such instruments is their ability to simultaneously display plural signals. If the waveforms are overlapped, it is difficult, if not impossible, to distinguish between them. If the screen is divided among the signals, each trace will have a minimal total height, typically less than an inch, so that the resolution of each trace is poor. The problems associated with displaying multiple traces on prior art oscilloscopes are compounded when multiple horizontal and vertical reference lines are also displayed.

SUMMARY OF THE INVENTION

In the preferred embodiment of the present invention, each of three input signals is displayed in the discrete color of green, red or blue. In addition, each of the three independently variable horizontal reference lines and each of three independently variable vertical reference lines are displayed in green, red and blue colors. The three signals being displayed may thus overlap on the screen and fill the entire screen for maximum resolution while positively distinguishing between the three input signals and their associated horizontal and vertical reference lines.

Advantageously, this three color display is provided by a shadow mask color tube of the type used for color television. A high frequency vertical scan oscillator provides a raster across the face of the tube. Three comparators each responsive to one of the three input signals compare the magnitude of the input signal with a signal corresponding to the vertical position of the beam as the beam is scanned in a predetermined vertical direction across the face of the tube. Whenever the two signals are equal, a single dot of green, red or blue color is generated on the face of the cathode-ray tube. During the scan in the opposite vertical direction, the comparators compare green, red and blue horizontal reference signals with the signal corresponding to the vertical position of the beam. Whenever the signals are equal, a single dot of green, red or blue color is generated on the face of the cathode-ray tube. A corollary advantage is that since each comparator is connected to a respective one of the signal channels, excellent channel to channel isolation is achieved.

Additional detector stages are responsive to the vertical scan signal and the horizontal drive signal for energizing each of the beams at a predetermined position along the horizontal screen axis for providing adjustable green, red and blue vertical reference lines. These detector stages are advantageously responsive to the top and bottom of each vertical scan so that the trace is initiated at the beginning of a scan in a predetermined direction and terminated at the end of such scan as to energize the beams for a single vertical trace to provide vertical reference lines of high resolution.

An additional feature of the invention is the provision of means for correcting for both vertical and horizontal convergence. The vertical convergence circuit includes an oscillator which is synchronized with the vertical scan rate to provide an output signal at twice the frequency of the vertical scan. The output of this oscillator is applied to three independently adjustable series tuned filters to selectively induce a leading or lagging phase shift and change the Q of the filter for varying the amplitude of the signal supplied to the green, red and blue convergence electromagnets associated with the cathode-ray tube. The horizontal convergence correction is accomplished by means which are responsive to the horizontal input signal for producing independently variable convergence correction signals which reproduce the mathematical model required, generally a parabolic wave shape.

Another feature of the present invention is the provision of a vertical scan oscillator which includes a feedback loop in which a switching amplifier drives a resonant circuit comprising the vertical deflection coil of the magnetic deflection yoke and a capacitor. The resultant voltage across the coil is much larger than the voltages across the switching amplifier so that the transistors in the amplifying stage are not subject to the high vertical scan voltages.

BRIEF DESCRIPTION OF THE DRAWINGS

FIG. 3 illustrates the multiple trace oscilloscope display provided by a three color oscilloscope constructed in accordance with the present invention;

FIG. 5 is an overall block diagram of a multicolor oscilloscope constructed in accordance with the present invention;

FIG. 6 is a detailed schematic of the comparators and comparator gating logic and pulse generation stages of FIG. 5;

FIGS. 9a, b, c, d, e, f and g illustrate waveforms at several points in the system of FIG. 8;

FIG. 13 is a detailed schematic of the vertical scan oscillator stage of FIG. 5.

DESCRIPTION OF THE PREFERRED EMBODIMENT

Figure 1:
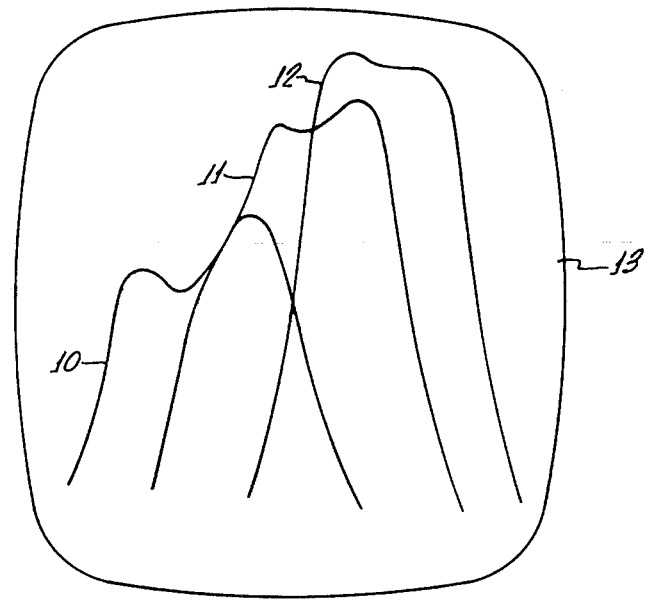
FIG. 1 illustrates a representative prior art oscilloscope display of multiple overlapping traces.
Figure 2:
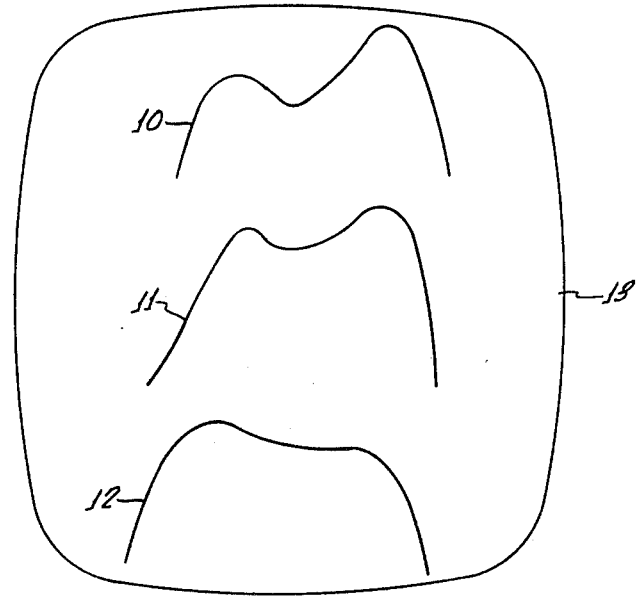
FIG. 2 illustrates a representative prior art multiple trace oscilloscope display wherein the display screen is divided up among the several traces.

Black and White Multiple Oscilloscope Displays Contrasted With Three Color Display of Invention Referring now to FIG. 1, there is shown a representative prior art oscilloscope display of multiple overlapping traces. Signals 10, 11 and 12 displayed simultaneously on screen 13 can be distinguished, if at all, at only selected portions of the display. Accordingly, it is customary not to overlap multiple signal traces but to instead physically separate them on the face of the screen 13 by dividing the screen area up among the plural signals. For example, as shown in FIG. 2, input signal 10 is displayed on the upper third of the screen, signal 11 is displayed on the midthird of the screen and signal 12 is displayed on the bottom third of the screen. Although this type of display clearly distinguishes between the individual signals, it has a serious disadvantage in that each signal occupies only a relatively small portion of the screen area. This has the effect of losing a substantial amount of resolution for each of the signal traces.

The oscilloscope display afforded by the present invention is shown in FIG. 3. The three traces 10', 11' and 12' are respectively displayed in the three different colors red, blue and green. As such, there is no problem in visually distinguishing one trace from another so that as shown, they may each occupy the entire display area of the screen 14. Accordingly, each trace enjoys the maximum resolution afforded by the cathode-ray tube.

An additional feature of the present invention is the provision of plural horizontal reference lines 15, 16, 17 and plural vertical reference lines 18, 19, 20 which are similarly displayed in the respectively different color of red, blue and green. Thus, horizontal reference 15 is displayed in red, and may be positioned anywhere on the display screen 14 without its being confused with the horizontal blue reference line 16 or the horizontal green reference line 17. Similarly, the vertical red reference line 18 may be located at any portion of the display screen for use with red signal trace 10' without its being confused with the blue or green vertical reference lines 19 and 20.

Overall Description of Three Color Oscilloscope

Figure 4A:
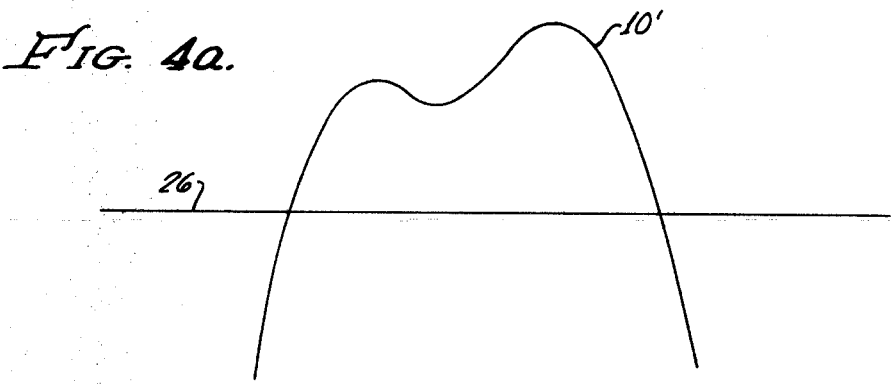
FIG. 4a illustrates a typical input signal and horizontal reference line and FIG. 4b illustrates the manner in which these signals are displayed on a multicolor oscilloscope constructed in accordance with the present invention.
Figure 4B:
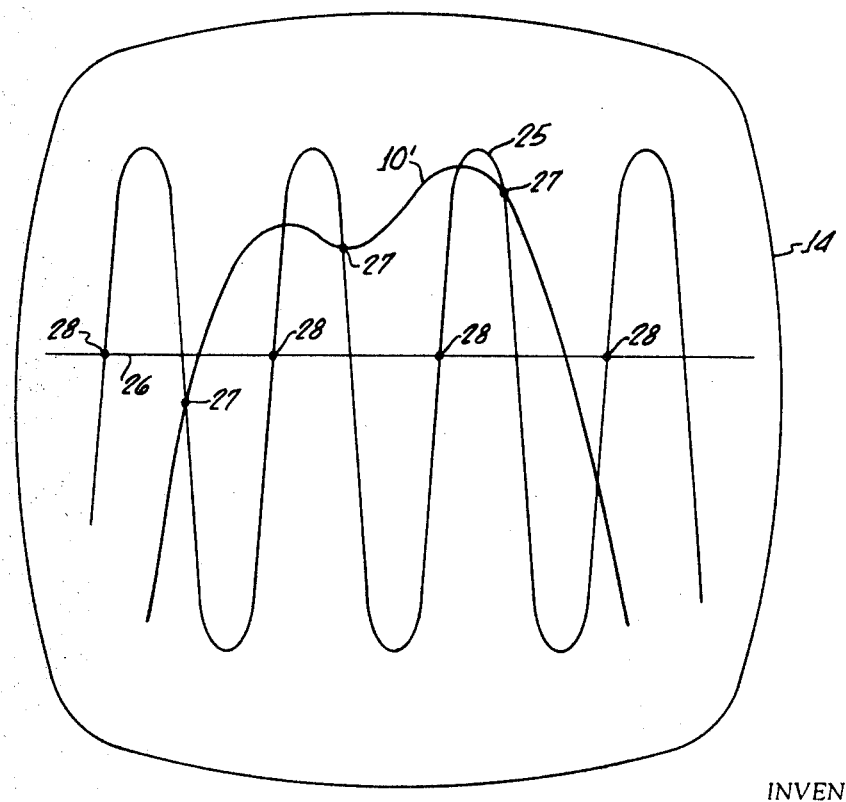

The basic function and system of the present invention are illustrated in FIGS. 4 and 5. An input signal on one of the three input channels of the oscilloscope is represented by waveform 10' and a horizontal reference line 26 corresponding to, for example, the zero voltage axis of the input signal are shown in FIG. 4a. The manner in which both the input signal 10' and reference 26 are simultaneously displayed in a single color is illustrated in the simplified diagram of FIG. 4b. In this FIG. an electron beam which excites a particular color phosphor is vertically swept upwardly and downwardly across the screen. The beam is also driven back and forth across the screen in a horizontal direction by the horizontal drive input signal (typically a 60 Hz. signal, although the present invention is adapted for a wide range of horizontal input signals) so as to travel across the screen 14 in generally the path 25 shown in FIG. 4b. In order to simplify the illustration of FIG. 4b, only a few vertical sweeps are shown and the sweeps are of reduced magnitude. Typically, however, the vertical scan rate is of the order of 38 kHz., i.e. substantially higher than the horizontal drive input, so that over 600 vertical traces occur for each horizontal sweep for a 60 Hz. horizontal drive thereby forming a raster on the screen 14.

During each scan of the beam across the screen in a predetermined vertical direction, the beam is energized at a point corresponding to the input signal and during each scan of the beam across the screen in the opposite vertical direction, the beam is energized at a point corresponding to the horizontal reference signal. IN the illustration of FIG. 4 and the apparatus described hereinafter, the beam is energized in accordance with the position of the input signal during the down scan and energized in accordance with the position of the horizontal reference signal during its up scan. Thus, as shown, the signal 10' is displayed by a series of dots 27 on the face of the cathode-ray screen occuring during respective down scans of the beam on the horizontal reference 26 is displayed by a series of dots 28 produced during the up scan of the beam across the screen. Since the raster is produced by a large number of vertical scans of the beam during each horizontal sweep, the dots combine to appear to the viewer as continuous waveforms on the screen 14 respectively conforming to the configuration of the input signal 10' and horizontal reference 26.

The multiple traces are provided by utilizing a three color display tube in which each of the multiple traces are displayed by dots of a particular color. An oscilloscope display system employing the three color, shadow mask cathode-ray tube of the type commonly used in color television sets is shown in FIG. 5. In the system shown and described herein, the shadow mask cathode-ray tube 29 is advantageously positioned 90° from the normal (as used for television display) so that higher amplitudes may be displayed along the vertical axis. Tube 29 includes three separate electron guns 30, 31 and 32 spaced 120° apart around the neck of the tube and tilted for producing three independent electron beams which pass through an aperture in the shadow mask 33 and respectively excite three different color phosphors on the screen 14.

The three beams are intensity modulated, i.e. selectively energized, by respective beam intensity control grids 34, 35 and 36. The three beams are deflected simultaneously by a magnetic deflection yoke 37 containing a vertical deflection coil responsive to current in lead 38 and a horizontal deflection coil responsive to current in lead 39. The vertical scan oscillator 40 produces an oscillatory current on lead 38 for scanning the beam upward and downward across the screen as shown by waveform 25 in FIG. 4b. The horizontal sweep current on lead 39 is supplied from the output of the horizontal deflection amplifier 41 which in turn is connected to the horizontal input signal on lead 42. Typically, the horizontal input signal is a 60 Hz. sawtooth waveform, although the user of the oscilloscope may provide any number of varying input waveforms on lead 42.

Convergence electromagnets 43, 44 and 45 are spaced 120° apart and associated with respective ones of the green, red and blue beams to provide convergence compensation as described below. Additional stages associated with the shadow mask tube such as the high voltage power supply for energizing the tube anode are not shown since they are well known in the color television art.

Green comparator circuit 50, red comparator circuit 51 and blue comparator circuit 52 are each respectively responsive to one of the input signals, one of the plural horizontal reference signals and an output of the vertical scan oscillator. Thus, the green comparator circuit 50 is responsive to the green input signal on lead 53, the green reference signal on lead 54 and a vertical position signal on output 55 of the vertical scan oscillator 40. In the drawing and elsewhere in the specification, the green, red or blue label on an input signal or reference does not signify any attribute of an input signal or reference signal except to indicate that the signal is applied to a terminal which will produce a corresponding color trace on the face of the oscilloscope tube. During each scan of the beam across the tube, the magnitude of the vertical position signal (which is proportional to the vertical position of the cathode-ray beam) is compared with the magnitude of the green input signal and the magnitude of the green reference signal. Whenever the vertical position signal is equal in magnitude to the green input signal, a signal is produced on output lead 56 and whenever the vertical position signal is equal in magnitude to the green horizontal reference signal, a signal is produced on output lead 57. The signals on leads 56 and 57 are applied to the comparator gating logic and pulse generating circuit 58. This circuitry distinguishes between the up scan and the down scan of the beam by means of a vertical switch signal on lead 60 supplied by the vertical scan oscillator 40. During each down scan of the beam, the comparator gating logic and pulse generating circuit 58 responds to the signal on lead 56 and supplies a pulse on output lead 59 to the intensity modulating grid 34 associated with the green electron gun 30 for generating a single green dot 27 (FIG. 4b) on the face of the screen coincident with the instant of time that the input signal and vertical position signal are equal. During each up scan of the beam, the comparator gating logic and pulse generating circuit 58 responds to the signal on lead 57 and supplies a pulse on output lead 59 to the intensity modulating grid 34 for generating a single green dot 28 (FIG. 4b) on the face of the screen coincident with the instant of time that the green horizontal reference signal and vertical position signal are equal. Similarly, the other comparators 51 and 52 in conjunction with the comparator gating logic and pulse generating circuit 58 produce single red and blue dots on the down scan respectively corresponding to the red and blue input signals and single red and blue dots respectively corresponding to the red and blue horizontal reference signal on each up scan.

As the entire electron beams are deflected over the face of the cathode-ray tube, a vertical convergence circuit 60 responsive to the vertical scan oscillator 40 supplies correction currents to the vertical convergence coils of the green, red and blue electromagnets 43, 44, 45 on respective leads 61, 62 and 63. Likewise, a horizontal convergence circuit 65 is responsive to the horizontal deflection current on lead 39 and produces correction currents on respective leads 66, 67 and 68 to the horizontal convergence coils of the electromagnets 43, 44 and 45.

Vertical reference line generator 70 is responsive to both the horizontal deflection current on lead 39 and the vertical switch signal on lead 60 for selectively energizing the beam during a single vertical sweep to produce the green, red and blue vertical reference lines 18, 19 and 20 shown in FIG. 3.

Detailed Description of Comparators and

Comparator Gating Logic and Pulse Generation Stages

Figure 7:
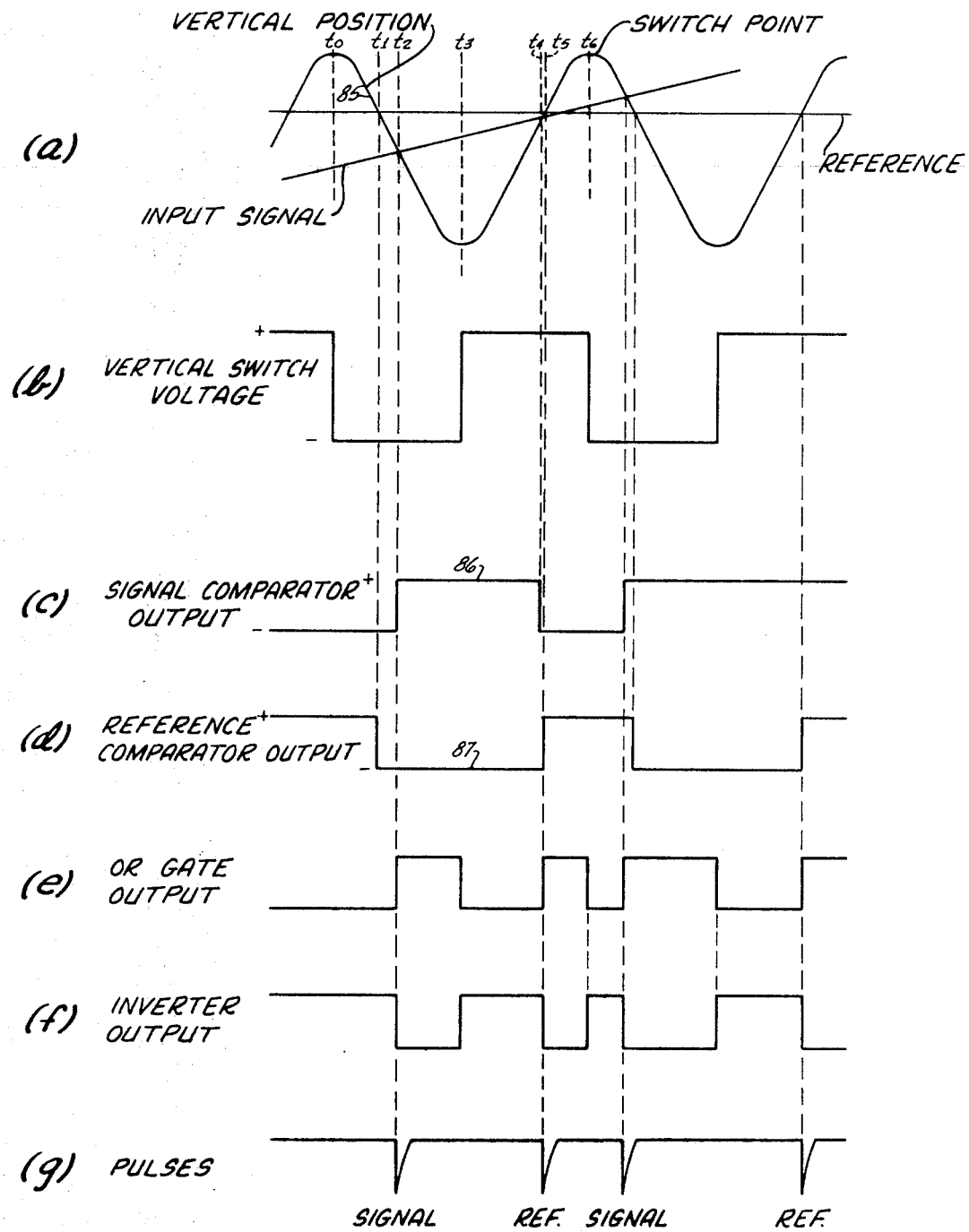
FIG. 7a, b, c, d, e, f and g illustrate waveforms at several points in the system of FIG. 6.

A more detailed schematic of the green, red and blue comparators 50, 51 and 52 and the comparator gating logic and pulse generation circuit 58 is illustrated in FIG. 6. An understanding of the operation of this circuitry is facilitated by the waveform shown in FIG. 7. As shown, each of the green, red and blue comparators 50, 51 and 52 includes a first or signal comparator responsive to the input signal and the vertical position signal and a second or reference comparator responsive to the horizontal reference signal and the vertical position signal. Thus, the green comparator includes a signal comparator 75 and a reference comparator 76, each of which are typically a differential amplifier. As is well known in the art, the output of this amplifier is positive as long as the voltage supplied to its positive input terminal is larger in magnitude than the voltage supplied to its negative input terminal, whereas the voltage at its output is negative or at ground potential when the potential supplied to its negative terminal is greater than the potential supplied its positive terminal.

In the specific example shown, the input signals, horizontal reference signals, vertical position and vertical switch signals are voltages. The amplitudes of the user's green, red and blue input signals are varied in direct coupled, preamplifier and attenuation stages (not shown) respectively connected to the inputs of the signal comparators so that signals of differing amplitude will fill the height of the screen 14. A feature of this invention is that the user may supply both vertical and horizontal inputs whose wave shapes vary randomly with time and whose frequency may include DC. The green input signal on lead 53 is connected to the positive input terminal of the signal comparator 75 and the green horizontal reference voltage on lead 54 is connected to the negative input terminal of the reference comparator. Typically, this reference voltage is produced by direct current source 77 connected to fixed terminals of a potentiometer 78. The midpoint of the potentiometer resistor element is grounded as shown so that either a positive or negative voltage may be supplied to the movable contact connected to the lead 54. The vertical position signal—a voltage proportional to the vertical position of the electron beam in the cathode-ray tube—is supplied on lead 55 to the negative input terminal of the signal comparator 75 and the positive input terminal of the reference comparator 76. This voltage is produced as shown by connecting resistor 79 in series with the vertical yoke coil so that a voltage is produced across the resistor 79 which is proportional to the current through the vertical yoke, which in turn is directly proportional to the position of the beam at any instant of time. As a result of the connection shown in FIG. 6, whenever the vertical position voltage is greater in magnitude than the input signal voltage, the output of the associated signal comparator is negative. And whenever the vertical position voltage is lower than the input signal voltage, the output of the associated signal comparator is positive. Referring to FIG. 7a, the vertical position voltage is shown as a sinusoidal voltage 85 and the input voltage is shown for purposes of illustration as a signal 10' corresponding to a small portion of the waveform 10 of FIG. 4b. However, it should be understood that the input signal can take any configuration depending upon the type of signal which is desired to be displayed on the oscilloscope screen. As noted above, the vertical position voltage is proportional to the position of the electron beam. Thus, at time $t_0$, the electron beam is at the top of the screen and at time $t_3$, having scanned from top to bottom, is at the bottom of the screen. The up scan follows the down scan between times $t_3$ and $t_6$.

FIG. 7c illustrates the output of the signal comparator as having a negative potential when the vertical position voltage is greater than the signal voltage and changing to a positive voltage at time $t_2$ when the vertical position voltage and the input signal are equal in magnitude. The output of the signal comparator remains positive while the input signal is greater than the vertical position signal until time $t_4$, at which time the vertical position voltage again equals the input signal voltage. At this time, the signal comparator voltage again becomes negative due to the greater magnitude of the vertical position voltage. Accordingly, a pulse 86 having leading and lagging edges corresponding to the input signal magnitude is produced during each vertical scan of the beam.

FIG. 7d illustrates the output of the reference comparator as having a positive potential when the vertical position voltage is greater than the reference voltage and changing to a negative voltage at time $t_1$ when the vertical position voltage and the reference voltage are equal in magnitude. At time $t_5$, during the up scan of the beam, the beam position and input signal again coincide causing the output of the reference comparator to change from a negative to a positive potential and remain at this level for the remainder of the scan. Accordingly, a pulse 87 having leading and lagging edges corresponding to the horizontal reference signal magnitude is produced during each vertical scan of the beam.

As heretofore noted, during the down scan of the beam, he comparison with the reference signal is to be ignored. This is accomplished within the comparator gating logic and pulse generator circuit 58 by and AND gate, e.g. gate 90, which ANDs the output 57 of the green reference comparator 76 and the vertical switch voltage. Another AND gate 91 ANDs the output 56 of the green signal comparator 75 and the output of an inverter 92 which inverts the vertical switch signal. The outputs of respective AND gates 90 and 91 are combined in OR gate 93. The vertical switch voltage is shown in FIG. 7b as a square wave voltage which is derived from the output of the vertical scan oscillator 40 by a voltage dividing circuit comprising resistors 91 and 92 and clipping circuit 94 for converting the sine wave output of oscillator 40 to a square wave. This square wave crosses the zero axis at the top and bottom of each vertical beam scan across the face of the tube screen, e.g. at times $t_0$, $t_3$ and $t_6$. Thus, the vertical switch voltage leads by 90° the vertical position voltage shown in FIG. 7a. The negative vertical switch voltage during each down scan closes or disables AND gate 90 preventing any pulse produced at the output of comparator 76 from appearing at the output of OR gate 93. This operation is illustrated in FIG. 7e wherein no output is produced at the output of the OR gate at time $t_1$ corresponding to the output of the reference comparator shown in FIG. 7d. Contrariwise, during the down scan, AND gate 91 is opened or enabled by the positive output of inverter 92 (the vertical switch voltage inverted) so that at time $t_2$, the output of the OR gate 93 switches from a negative to a positive potential as shown in FIG. 7e.

In a similar manner, the output of the signal comparator is ignored during the up scan. During this interval between times $t_3$ to $t_6$, the vertical switch voltage is positive. This voltage when inverted by inverter 94 closes AND gate 91, thus preventing any output signal of the signal comparator 75 from reaching OR gate 93. This operation is shown in FIG. 7e wherein no output is produced at time $t_4$ corresponding to the output of the signal comparator at this time. However, during each up scan, the AND gate 90 is opened by the positive vertical switch voltage so that an output is produced at the output of OR gate 93 at time $t_5$ corresponding to the output of the reference comparator at this time. As a result, there is achieved at the output of OR gate 93 a series of pulses occurring at twice the repetition rate of the vertical scan oscillator.

The comparator gating logic and pulse generating circuit 58 further comprises a pulse generating circuit for each color channel comprising, for example, an inverting amplifier 95, a differentiator circuit 96, a rectifying diode 97, and a pulse amplifier 98. The inverter 95 inverts the output of OR gate 93 to produce the pulse train shown in FIG. 7f. These inverted pulses are differentiated and the positive pulses removed by rectifying diode 97 to produce a series of very short pulses at the input of pulse amplifier 98, as shown in FIG. 7g. These amplified, short duration pulses are connected via lead 59 to pulse the green intensity modulating grid of the shadow mask color cathode-ray tube. Similarly, pulses are produced in the red and blue channels of the circuit 58 for respectively controlling the red and blue modulating grids, to provide the display dots shown in FIG. 4b. As shown in FIG. 7g, alternate ones of these pulses correspond to the vertical display position of the input signal and alternate ones correspond to the vertical display position of the input reference signal for a particular color. Also, it will be noted that the signal pulses occur during the respective down scans of the vertical down scan and the reference pulses occur during respective up scans of the beam during its vertical scan across the screen of the cathode-ray tube.

Detailed Description of

Vertical Reference Line Generator

Figure 8:
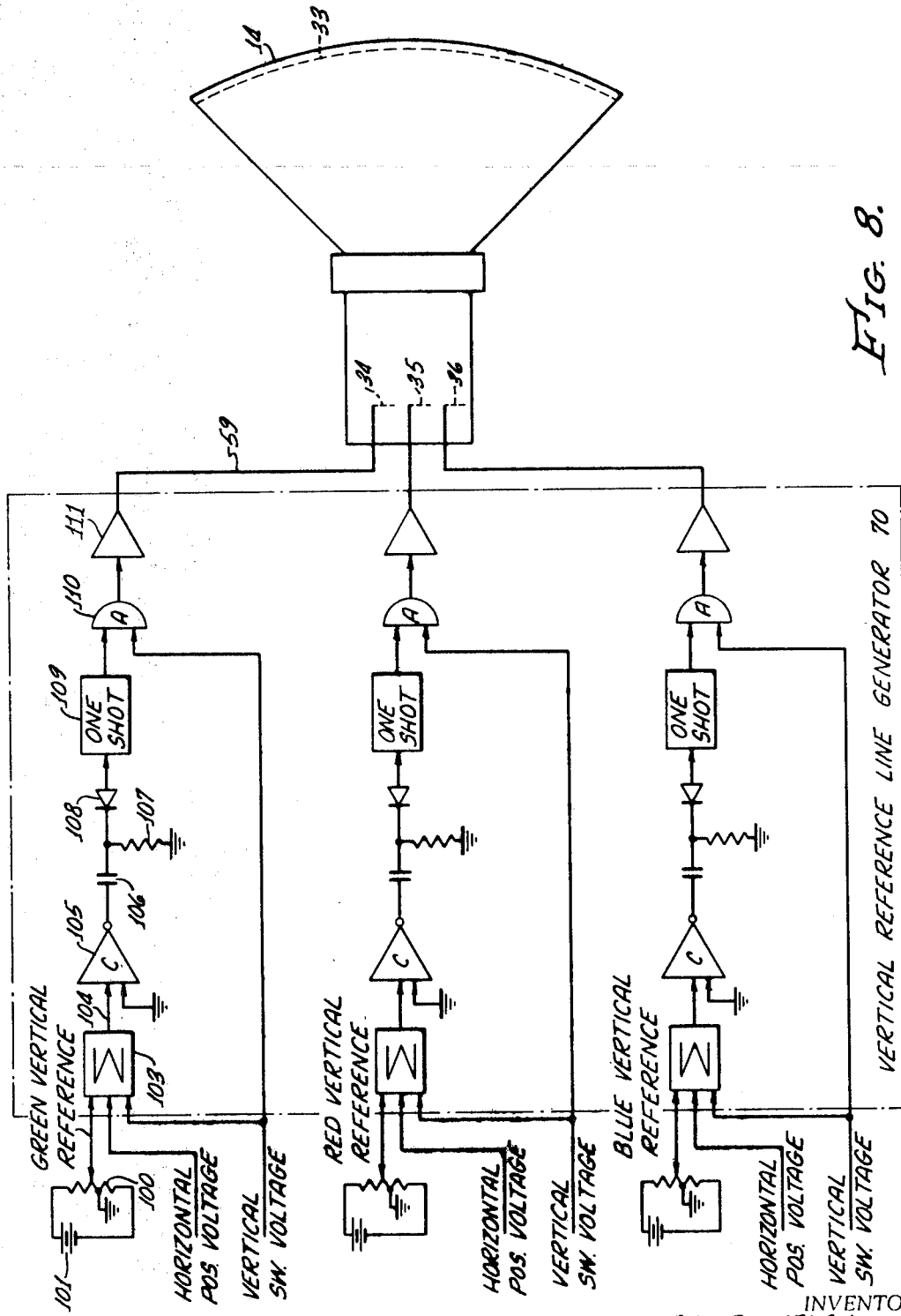
FIG. 8 is a detailed schematic of the vertical reference line generator of FIG. 5.

The circuitry of the vertical line generator 70 is illustrated in FIG. 8. Variable voltages corresponding to predetermined green, red and blue positions along the horizontal axis of the screen are obtained from a series of potentiometers and voltage sources. Thus, the fixed terminals of potentiometer 100 are connected to a voltage source 101. The midpoint of the potentiometer is grounded so that both positive and negative voltages can be applied to the green vertical reference input lead. This green vertical reference voltage is added to both the horizontal position voltage and the vertical switch voltage in summation circuit 103. The output of this summation circuit on lead 104 is compared in a detector stage comprising an inverting comparator 105. When the sum of the voltages applied to lead 104 are less than a predetermined fixed voltage, e.g. 0.6 volts, the inverting comparator output is a positive potential. When the potential on lead 104 is greater than 0.6 volts, the output of the inverting comparator is a negative or ground voltage. The instant of time at which this voltage transition occurs corresponds to a particular position of the green beam along the horizontal axis of the screen 14, which position is predetermined by the setting of the green potentiometer 100. These voltage transitions at the output of the inverting comparator 105 are differentiated by capacitor 106 and resistor 107 and the negative pulses are conducted via diode 108 to trigger the one-shot multivibrator 109.

One-shot multivibrator 109 is preset to provide a pulse at its output substantially equal in width to the time of a single vertical scan in one direction across the screen of the cathode-ray tube. This pulse is ANDed with the vertical switch voltage in AND gate 110. When these pulses coincide, i.e. at the initiation of a predetermined up scan of the green beam, a pulse is produced at the output of AND gate 110 which is amplified in pulse amplifier 111. The output of pulse amplifier 111 is coupled to the green intensity control grid 34 to energize the green gun during an up scan of the electron beam across the face of the screen at a position along the horizontal axis determined by the voltage applied to the green vertical reference.

A particular feature of the vertical reference line generator stage 70 is that the vertical reference line is produced coincident with the initiation of a vertical scan of the beam. The horizontal position voltage and the vertical reference signal are added in summation circuit 103 so that their sum is approximately 0.6 volts when the horizontal position of the beam corresponds to the desired position of the vertical reference. Initiation of the vertical reference at the bottom of the scan is provided by combining the vertical switch voltage with these other two voltages such that the output of the inverting comparator occurs only at the initiation of a vertical up scan. The resultant summation voltage on lead 104 is shown in FIG. 9c as waveform 115 and comprises the summation of a horizontal position voltage which may be any of many input waveforms but is shown in FIG. 9b as a triangular-shaped waveform, the constant vertical reference signal 117 illustrated in FIG. 9b, and the square wave vertical switch voltage 114 of FIG. 9a. The period of waveform 114 is exaggerated for purposes of illustration. Thus, assuming a vertical scan frequency of 38 kHz. and a horizontal scan frequency of 1000 Hz., some 38 vertical pulses 114 are produced during each cycle of the horizontal scan signal 116 (FIG. 9b). For lower horizontal scan rates, proportionately more pulses 114 are produced during each cycle of the horizontal scan. The threshold voltage of the comparator is illustrated by horizontal line 118 in FIG. 9c. When the summation voltage 115 on lead 104 exceeds this threshold voltage, the output of the comparator 105 swings negative as shown by waveforms 119 in FIG. 9d. This voltage transition is differentiated and only the resulting negative pulses 120 (FIG. 9e) are used to fire the one-shot whose output is shown as waveform 121 in FIG. 9f. By virtue of the responsiveness of the detector stage 105 to the vertical switch signal, the leading edge of pulse 121 is coincident with the initiation of an up scan of the beam across the screen.

Another significant feature of the vertical reference line generator stage 70 is that the beam is maintained ON for only a single vertical sweep, thereby insuring that sharp green, red and blue reference lines are achieved. The one-shot multivibrator 109 is set to provide a pulse width W (FIG. 9f) approximately equal to a vertical up scan. This output pulse 120 is ANDed with the vertical switch signal so that the lagging edge 122 of the pulse at the output of AND gate 110 (shown in FIG. 9g) occurs precisely at the end of the up scan because the vertical switch voltage at this point changes sign, resulting in opening of the AND gate 110. As a result, each of the green, red and blue vertical reference lines is locked to a single predetermined raster line.

As shown in FIG. 9d, the output of the detector 105 changes twice during each cycle of horizontal scan, i.e. the voltage changes negatively during the scan from left to right across the face of the tube and positively during the scan from right to left. The latter of these transitions is ignored by virtue of diode 108 so that the vertical reference lines are produced only during the beam scan from left to right.

Detailed Description of Vertical and Horizontal Convergence Stages

It is necessary for satisfactory operation of multiple electron beam cathode-ray tubes to cause the multiple electron beams to converge at a point. The electron guns 30, 31 and 32 shown in FIG. 5 are generally oriented about the central axis of the cathode-ray tube and separated by equal angles about this axis. At the face of the tube, there is a luminescent screen 14 provided with a multiplicity of small phosphor areas arranged in groups, and behind this screen there is generally a shadow mask 33 which is a shield having a plurality of holes. For proper alignment of the tube, the electron beams emerging from the various electron guns must, at any given instant, pass through the one of the plurality of holes in the shadow mask and strike the screen behind the shadow mask. Static color convergence of the various electron guns is accomplished by first tilting each of the guns toward the central axis of the cathode-ray tube, and subsequently adjusting each of the emerging beams with a separate permanent magnet such that the various electron beams converge through a hole in the shadow mask which lies on the central axis of the cathode-ray tube.

However, since the shadow mask and screen are generally not shaped as a segment of a sphere, the radius of which is equal to the distance of the electron guns, it is necessary in addition to this static convergence adjustment to add dynamic convergence to the electron beams. Thus, when the electron beams are to focus through a hole in the shadow mask which is displaced from the axis of the cathode-ray tube, the distance between the electron guns and the shadow mask hole is different from the distance between the electron guns and the shadow mask hole along the cathode-ray tube axis. Therefore, the forces applied to the electron beams must be altered such that these electron beams converge at a greater distance from the electron guns.

Figure 10A:
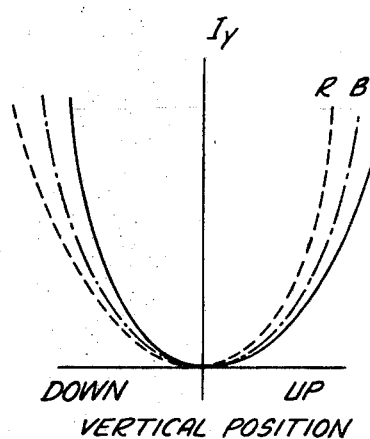
FIGS. 10a and b illustrate the parabolic dynamic correction currents required for the shadow mask cathode-ray tube of FIG. 5.
Figure 10B:
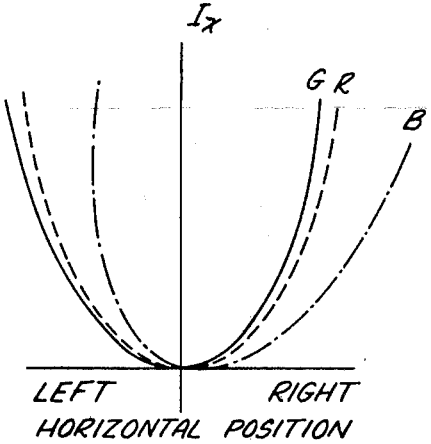

Since the shadow mask is generally spherical in shape but has a radius which is greater than the distance between the electron guns and the shadow mask, the correction which must be applied as the electron beams are swept over the surface of the screen is generally parabolic in shape. Since he particular position of each of the electron guns is different, the particular dynamic correction which must be applied to each of these beams for a particular displacement from the cathode-ray tube axis will be different. These dynamic corrections are graphically depicted in FIG. 10, FIG. 10a showing the dynamic convergence correction required as the electron beam is shifted vertically from the central position, and FIG. 10b showing the convergence correction for horizontal displacement. It will be seen that, in both FIGS. 10a and 10b, when the electron beams are focused at the central axis of the cathode-ray tube, that is, when the currents used to displace the electron beams are zero, the required convergence correction $I_y$ or $I_x$ is, in turn, zero, since the cathode-ray tube is statically corrected at this point. As the deflection currents are increased to force the electron beam in either direction away from the central axis of the cathode-ray tube, the convergence correction $I_y$ or $I_x$ increases parabolically for each of the electron beams. In this case, the green, red and blue beams, labeled G, R and B are being deflected to a specific hole in the shadow mask. It will be noted from FIG. 10a and 10b that, although the corrections in a given direction for each of the three electron beams shown are parabolic in shape, the axes of the a various parabolas may be tilted due to the different location around the cathode-ray tube axis of the various electron guns. The corrections therefore involve a parabolic displacement superimposed upon a linear displacement which tilts the convergence pattern for a given gun. This correction pattern may be mathematically described as a parabola with its origin at the central axis of the cathode-ray tube, or:

$I_y = K_1 Y^2$ for the Y axis, and (1)
$I_x = K_2 X^2$ for the X axis. (2) Upon this parabolic function is superimposed the linear tilt function described above, which is:
$I_y = K_3 Y$ for the Y axis, and (3)
$I_x = K_4 X$ for the X axis. (4) Therefore, the complete functions required for color convergence of a given electron gun may be described mathematically as:
$I_y = K_1 Y^2 + K_3 Y$ for the Y axis, and (5)
$I_x = K_2 X^2 + K_4 X$ for the X axis. (6) In the present invention, the electronic means used to achieve the color convergence correction factors for the vertical and horizontal scan are dissimilar since the vertical drive circuitry produces a constant scan signal while the horizontal scan current is dependent upon the particular application for which the device is used.

Vertical deflection is accomplished by a 38 kHz. sinusoidal scan. Therefore: $Y(t) = A \sin \omega t$
Where $\omega = 2\pi f$, and $F = 38,000$ Hz. (7) Since $I_y = K_1 Y^2 + K_{aq} Y$, (5) Therefore: $I_y(t) = K_1 (A^2 \sin^2 \omega t) + K_3 (A \sin \omega t)$ (8)
or:

$$I_y(t) = \frac{K_1 A^2}{2} (1 - \cos 2\omega t) + K_3 (A \sin \omega t) \quad (9)$$

or:

$$I_y(t) = \frac{K_1 A^2}{2} - \frac{K_1 A^2}{2} (\cos 2\omega t) + K_3 (A \sin \omega t) \quad (10)$$

The constant term in equation 10, that is $K_1 A^2 / 2$, may be neglected since it can be included in the static convergence adjustment, so that:

$$I_y(t) = -\frac{K_1 A^2}{2} (\cos 2\omega t) + K_3 (A \sin \omega t) \quad (11)$$

From FIG. 10a, it can be seen that the tilt term, that is, $K_3 (A \sin \omega t)$, is quite small and may be approximated by adding phase shift to the primary correction signal. Thus, $I_y$ may be approximated by the following correction:
$I_y = K_5 \cos(2\omega t + \Theta)$ where (12)

$$K_5 = \frac{K_1 A^2}{2}$$

Figure 11:
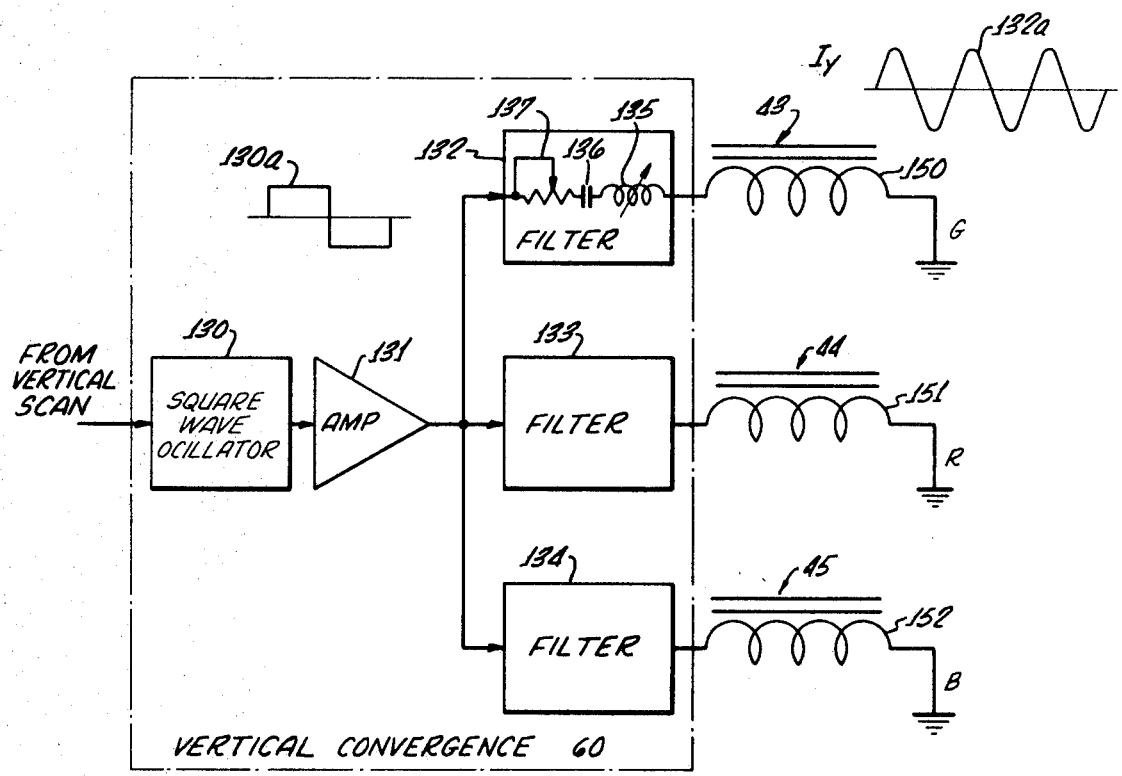
FIG. 11 is a detailed schematic of the vertical convergence stage of FIG. 5.

The circuit used to provide the function of equation 12 for each of the electron beams is shown in FIG. 11. Pulses derived from the vertical scan oscillator 40 are used to synchronize a 76 kHz. square wave oscillator 130, the output waveshape of which is shown at 130a. The 76 kHz. signal supplies the $2\omega$ term of equation 12, $\omega$ being described in equation 7 as a function of the frequency 38 kHz. This wave shape 130a is amplified in amplifier 131 and applied to three series tuned 76 kHz. filters 132, 133 and 134.

These filters function identically, and thus only the operation of filter 132 will be explained. This filter 132 includes a variable inductor 135 and a capacitor 136, the inductor being adjusted close the the value of inductance which resonates with the capacitance 136 at 76 kHz. By selecting the inductance value of inductor 135 above and below the resonant inductance, a leading or lagging phase shift may be inducted upon the signal from the square wave oscillator 130. This phase shift supplies the $\Theta$ term of equation 12. The filter 132, being tuned near the square wave fundamental frequency, also attenuates the high frequency components of the square wave 130a, leaving only the fundamental sine wave, as shown at 132a. The filter 132 also includes a variable series resistance 137 which, by changing the filter Q, varies the amplitude of the signal 132a supplied to the convergence coil 150. This change in Q supplies the K value of equation 12. Each filter is connected to a respective coil 150, 151 and 152 of the convergence electromagnets 43, 44 and 45.

Figure 12:
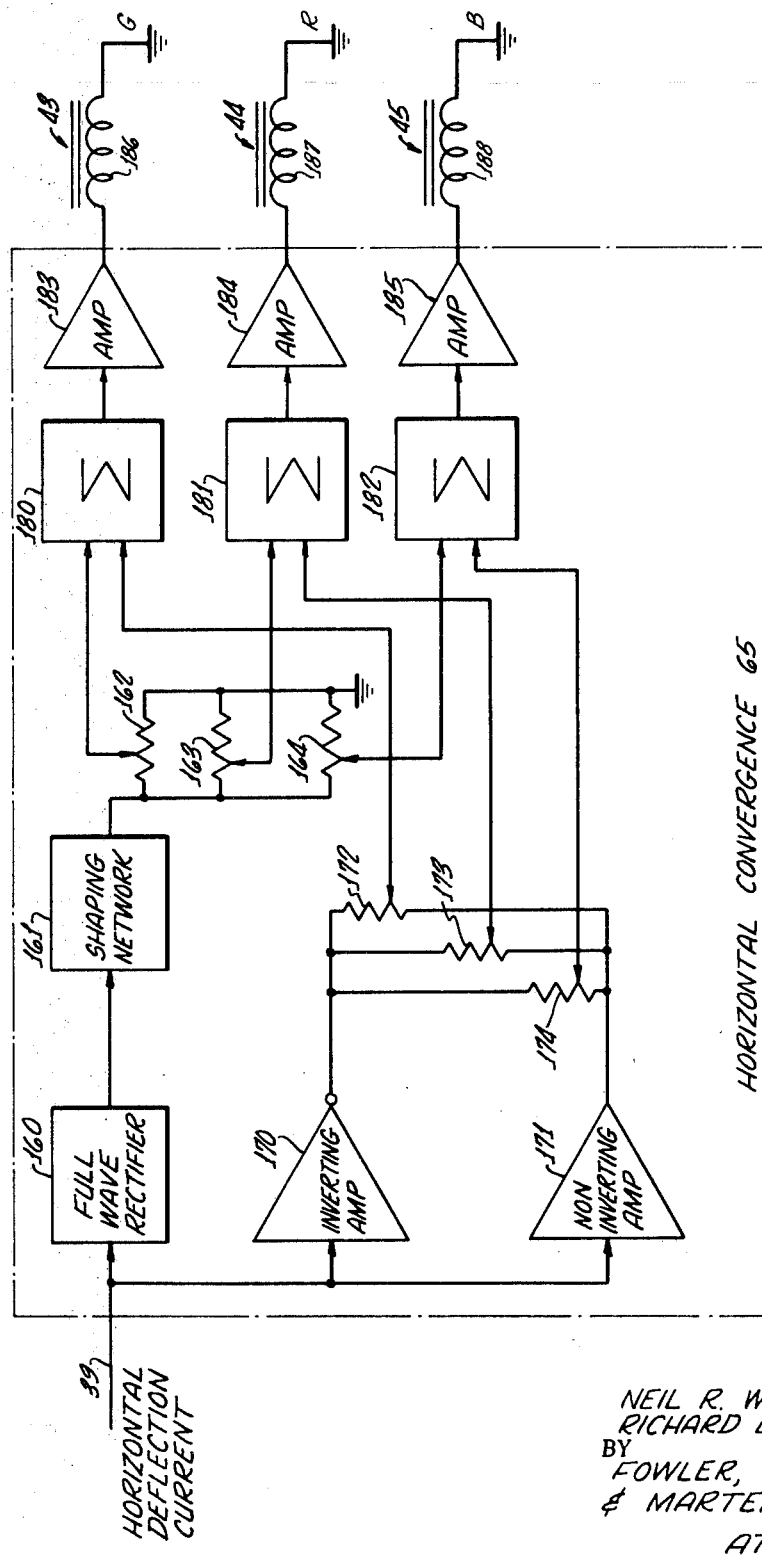
FIG. 12 is a detailed schematic of the horizontal convergence stage of FIG. 5.

The voltage which may be applied to the horizontal input of the display system may be almost any waveform with frequency components from DC to 1,000 kHz. The horizontal convergence correction si accomplished by means which are responsive to the horizontal input signal for producing output convergence correction signals which reproduce the mathematical model of equation 6 for the parabolic wave shape. This circuit is shown in FIG. 12 and functions as follows:

To produce the $K_2 X^2$ term of equation 6, the horizontal deflection current on lead 39 is first fully rectified in a full-wave rectifier circuit 160 such that all of the negative portions of the horizontal deflection current are made positive. This rectification is necessary to duplicate the mathematical model, since a negative number, where squared, is always made positive. This fully rectified wave is then processed in a wave shaping network 161 comprising a nonlinear device such as a diode so that the output waveform at any given time is the square of the input waveform. This output waveform of the wave shaping network is connected to the fixed terminals of three parallel potentiometers 162, 163 and 164. These potentiometers vary the amplitude of the output signal from the wave shaping network 161 and thus supply the $K_2$ term of equation 6 for each of the green, red and blue electron guns. The $K_4 X$ term of equation 6 is produced by processing the horizontal deflection current through a linear inverting amplifier 170 and a linear noninverting amplifier 171 simultaneously. The inverting amplifier thus produces a negative linear reproduction of the input wave, while the noninverting amplifier produces a positive linear reproduction of the input wave. The outputs of these two amplifiers are summed across three parallel potentiometers 172, 173, 174 for each of the green, red and blue electron guns. Varying the position of the adjustable contact on the potentiometers 172, 173, 174 produces a linear term corresponding to the constant $K_4$ which may be either positive or negative depending on the position of the movable contact. In order to superimpose the $K_2X^2$ and $K_4X$ terms, respective summing circuits 180, 181 and 182 are used for respective ones of the horizontal convergence coils. The outputs of each summing circuit are respectively coupled to amplifiers 183, 184 and 185 which directly energize respective convergence correction coils 186, 187 and 188 of the convergence electromagnets 43, 44 and 45. It can be seen that, for both the $X^2$ and the $X$ terms, the constants $K_2$ and $K_4$ may be independently adjusted for each of the plurality of electron guns through adjustment of an individual potentiometer 162, 163, 164, 172, 173 and 174. This allows the horizontal correction shown in FIG. 10b to be accomplished for each of the green, red and blue electron beams.

Detailed Description of Vertical Scan Oscillator

The vertical scan oscillator 40 shown in FIG. 13 is used to generate a high frequency high voltage sine wave for vertical deflection of the cathode-ray tube. Since the resolution of a scanning-type display is dependent upon the density of the dots which form a signal trace, a very rapid vertical scan produced by a high frequency vertical scan oscillator is required. This oscillator comprises a positive feedback loop including a switching amplifier 190, the input of which is derived form the output to produce an oscillatory condition. The frequency of oscillation is that frequency at which the input and output of the 38 amplifier 190 are in phase, which in turn is dependent upon the remainder of the elements in the feedback loop. In the preferred embodiment, the frequency of oscillation of the switching amplifier is approximately 38 kHz. The input to the switching amplifier, which is derived from the current through the vertical deflection coil 191 of the magnetic deflection yoke 37, is a sine wave, a amplitude of which is sufficient to overdrive the switching amplifier such that the amplifying components are saturated at both the positive and negative excursion of the sine wave. This saturation condition produces an output from the switching amplifier 190 which is essentially a square wave at a frequency of oscillation, as shown at 190a, the amplitude of the square wave being dependently upon the bias voltage of the amplifier, which is typically ±45 volts. Such a square wave is an efficient high current drive circuit since the saturated condition of the amplifying components minimizes power dissipation within the amplifier itself.

The output of the switching amplifier is coupled to a low pass filter and impedance matching circuit 192. This low pass filter circuit will attenuate signals which have a frequency above the fundamental square wave frequency of 38 kHz., and thus will reduce the harmonic content of the square wave which, in effect, rounds the corners of the wave such that the major frequency component at the output of the low pass filter circuit is at 38 kHz. The elements of the low pass filter are selected to match the impedance between the output of the switching amplifier and the input to the resonant circuit which will be described later. A typical low pass filter circuit may comprise a 0.5 mh. coil 193 in series, and a 0.0068 μfd. shunt capacitor 194 to ground.

An important feature of the vertical scan oscillator shown in FIG. 13 is that it produces a high voltage, e.g. over 2000 volts, sine wave for driving the vertical deflection coil 191, whereas considerably lower voltages, e.g. 90 volts peak to peak, are present across the transistors in the output stage of the switching amplifier 190. Conversion of the 45 volts square wave output of the amplifier 190 to a high voltage sine wave for driving the vertical deflection coil is provided by a resonant circuit comprising the vertical deflection coil 191 and series capacitor 195, this series circuit being connected to the output of the low pass filter 192. The impedance $Z$ of this capacitor-coil combination may be expressed as:

$$Z = R + j\left(2\pi fL - \frac{1}{2\pi fC}\right) \qquad (13)$$

Where:
$R$ = the resistance of the circuit, usually due to the resistance of the vertical deflection coil winding;
$f$ = the input frequency to the circuit;
$L$ = inductance of the vertical deflection coil in henrys;
$C$ = capacitance of the capacitor in farads.

The capacitor is selected to produce a resonant condition with the vertical deflection coil at the frequency of the switching amplifier, this resonant condition occuring when the capacitive and inductive reactances are exactly equal, but opposite. Thus:

$$2\pi fL = \frac{1}{2\pi fC} \qquad (14)$$

The reactance elements in the impedance equation above thus neutralize each other, and equation 13 becomes:
$Z=R$ (15) leaving only the resistance of the circuit to oppose the flow of current. The current in the circuit may be expressed as:

$$I = \frac{E_{in}}{Z} \qquad (16)$$

Where:
$E_{in}$ = the input driving voltage
$I$ = the current in the series circuit. The current at the resonant frequency is therefore:

$$I = \frac{E_{in}}{R} \qquad (17)$$

Although the inductive and capacitive reactances neutralize one another in the operation of the entire tuned circuit, the impedance of each of these elements is still expressed as:

$$Z_c = \frac{1}{2\pi fc} \qquad (18)$$

$$Z_L = 2\pi fL \qquad (19)$$

Where:
$Z_c$ = reactance of the capacitor.
$Z_L$ = reactance of the coil.
and the voltage drop across the elements is:

$$E_c = \frac{I}{2\pi fc} \qquad (20)$$

$$E_L = I(2\pi fL) \qquad (21)$$

Where:
$E_c$ = voltage across the capacitor
$E_L$ = voltage across the coil. Therefore, since the circuit current is a function only of circuit resistance and input voltage, if the reactance of one of the elements is high in comparison with the circuit resistance, an effective voltage gain may be realized across this element at the resonant frequency. Thus, the voltage across the inductor at resonance is obtained by combining equations 21 and 17:

$$E_L = \frac{E_{in}(2\pi fL)}{R} \qquad (22)$$

The ratio of reactance of one of the circuit elements to the circuit resistance is called the circuit Q:

$$Q = \frac{2\pi fL}{R} \qquad (23)$$

Thus, combining equations 22 and 23, the equation for voltage across the coil becomes:
$E_L = QE_{in}$ (24) and the voltage gain is a function of the circuit Q.

Therefore, with an input voltage of 90 v. peak to peak, and a circuit Q of approximately 57.7, $E_L = 90(57.7) = 5,200$ volts peak to peak. In a typical case, for resonance at approximately 38 kc., with a vertical deflection coil 191 having an inductance of approximately 15 mh., the capacitor 195 will be approximately 1200 pf. This circuit thus produces a 5.2 kv.

peak to peak sine wave across the 15 mh. vertical deflection coil. This 5.2 kv. p-p, at 38 kc. will drive approximately 1.4 amps peak to peak through the coil, as shown at 191a.

The driving current in the vertical deflection coil is advantageously greater than that required for total deflection of the cathode-ray tube. In this condition, the vertical scan oscillator overdrives the vertical yoke of the cathode-ray tube 29 (FIG. 5) and limits the scanning function to that portion of the sine wave which is substantially linear. The end product, then, is a signal which will drive the vertical yoke of the cathode-ray tube at a rate of 38 kc. to produce a substantially linear series of high density vertical traces on the cathode-ray tube.

The current through the vertical deflection coil is sampled through the resistor 79 and this sampled voltage is used as the feedback signal to the input of the switching amplifier 190. Since the current in the vertical deflection coil is in phase with the output of the switching amplifier when the output frequency of the switching amplifier is 38 kc., the reference voltage which, in turn, is in phase with the current to the vertical deflection coil, will produce an input to the switching amplifier through phase shifter 199 which causes oscillation at 38 kHz.

Another advantage provided by the vertical scan oscillator 40 is that it synchronizes the vertical scan to the 60 Hz. line frequency so that the dots 27 and 28 (FIG. 4b) stand absolutely still and do not drift for a given vertical input signal when the horizontal input signal is line frequency or is a waveform that is synchronized to the line. This function is accomplished by phase comparator 200 in combination with the feedback loop for comparing the frequency of the feedback loop with the 60 Hz. alternating current line frequency. This phase comparator produces an error signal whenever the frequency of the feedback loop is not an even multiple of the line frequency, which error signal is coupled to the voltage controlled phase shifter 199. This phase shifter changes the phase of the feedback loop very slightly in response to an error signal from the phase comparator 200, which phase shift will, in turn, shift the oscillating frequency of the overall loop, since the switching amplifier 190 will oscillate at a frequency at which its input is in phase with its output.

Previous black and white oscilloscope systems have typically utilized a cathode-ray tube, the electron gun of which was electrostatically deflected, as opposed to the magnetic deflection used in the present system. Such electrostatic deflection systems, although they require high deflection voltages, typically operate at very low current levels even at high scan frequency, and therefore consume little power. Electrostatic deflection, however, does not lend itself to large screen displays and therefor the present multicolor cathode-ray, tubes are almost universally magnetically deflected. Since magnetic deflection, without the use of a resonant driving circuit such as that incorporated in the present invention, requires extremely high powered driving signals, especially as the deflection coil impedance increases with increased frequency, an X—Y direct plotting oscilloscope system such as those of the prior art becomes increasingly difficult as the bandwidth of the input signal increases. Therefore, an advantage of the present resonant circuit vertical scan oscillator is that it allows large screen displays in magnetically deflected cathode-ray tubes without prohibitive power requirements.

We claim:

1. An oscilloscope for displaying each of plural input signals in a respectively different color comprising:
   a cathode-ray tube having plural electron guns for producing plural independent electron beams for exciting respectively different colored phosphors on the tube screen;
   vertical deflection means for scanning said beams upwardly and downwardly across said screen;
   means for generating plural horizontal reference signals each corresponding to a horizontal reference display of respectively different color;
   plural comparator means each respectively responsive to one of said input signals and one of said plural horizontal reference voltages for (i) comparing the position of said beam with said input signal during the scan of said beam across said screen in a predetermined vertical direction and energizing the electron gun of said beam when the beam position corresponds to the magnitude of the input signal, and (ii) comparing the position of said beam with said horizontal reference signal during the scan of said beam across said screen in the opposite vertical direction and energizing the electron gun of said beam when the beam position corresponds to the magnitude of the horizontal reference signal.

2. An oscilloscope for displaying each of plural input signals in a respectively different color comprising:
   a cathode-ray tube having plural electron guns for producing plural independent electron beams for exciting respectively different colored phosphors on the tube screen;
   vertical deflection means for scanning said beams upwardly and downwardly across said screen;
   means responsive to said vertical deflection means for producing a vertical position signal proportional to the position of said beam;
   means responsive to said vertical deflection means for producing a switch control signal at the bottom and top of the scan of said beam across said tube screen;
   a first comparator for comparing one of said plural input signals with said vertical position signal;
   a second comparator for comparing said vertical position signal with a horizontal reference signal;
   means responsive to said vertical switch signal for alternately gating the output of one of said comparators to energize said cathode-ray tube during a down scan of said beam and the other of said comparators to energize said cathode-ray tube during the up scan of said beam.

3. An oscilloscope for displaying each of plural input signals in a respectively different color as described in claim 2 wherein said means for producing said vertical position signal comprises:
   means responsive to the current through the vertical yoke winding of said cathode-ray tube, said current being proportional to the vertical position of said beam.

4. An oscilloscope for displaying each of plural input signals in a respectively different color as described in claim 2 wherein said means for producing said vertical switch signal comprises:
   means responsive to the voltage across the vertical yoke winding of said cathode-ray tube, said signal changing sign at the top and bottom of each scan of said beam across the screen.

5. An oscilloscope for displaying each of plural input signals in a respectively different color comprising:
   a cathode-ray tube having plural electron guns for producing plural independent electron beams for exciting respectively different colored phosphors on the tube screen;
   vertical deflection means for continuously scanning said beams upwardly and downwardly across said screen;
   horizontal deflection means for deflecting said beams horizontally across said screen; and
   means for producing a vertical reference display line during said continuous scanning comprising:
   detector means responsive to said horizontal deflection means for detecting a predetermined position along the horizontal axis;
   means responsive to said detector means for energizing one of said electron beams of said cathode-ray tube to produce said vertical reference line at said predetermined position along the horizontal axis;
   said detector means being further responsive to said vertical deflection means so that said vertical reference line is initiated substantially coincident with the initiation of one excursion of said continuous vertical scan.

6. An oscilloscope for displaying each of plural input signals in a respectively different color comprising:
   a cathode-ray tube having plural electron guns for producing plural independent electron beams for exciting respectively different colored phosphors on the tube screen;
   deflection means for scanning said beams vertically and deflecting said beams horizontally across said screen, said vertical scanning being continuous; and
   means for producing a vertical reference display line comprising:
   means responsive to said deflection means for detecting a predetermined position along the horizontal axis;
   means responsive to said detector means for energizing an electron beam of said cathode-ray tube; and
   means responsive to the output of said detector means for maintaining said beam energized for a predetermined time period.

7. An oscilloscope for displaying each of plural input signals in a respectively different color as described in claim 6 wherein:
   said means for maintaining said beam energized for a predetermined time period includes a pulse generator responsive to said detector means for producing a pulse whose width is substantially coincident with the length of a single excursion of said continuous vertical scan of said beam across the face of said tube.

8. An oscilloscope for displaying each of plural input signals in a respectively different color as described in claim 6 wherein:
   said means for maintaining said beam energized for a predetermined time period includes a gate means responsive to the output of said detector means and to said deflection means so that said vertical reference line is terminated substantially coincident with the termination of one excursion of said vertical scan.

9. In a multicolor oscilloscope for displaying each of plural input signals in a respectively different color:
   a multielectron beam cathode-ray tube and means for continuously scanning said beams across the screen of said tube along a given axis;
   color convergence means for deflecting said electron beams to change the distance between the source of said electron beams and the point of convergence of said electron beams, said convergence means including:
   electromagnet means proximate said electron beams; and
   means for energizing said electromagnet means at a frequency which is double the scanning frequency of said electron beams along said given axis.

10. The multicolor oscilloscope of claim 9 wherein said means for energizing said electromagnet means includes an oscillator which is synchronous with said scanning frequency, said oscillator generating an output which is double the frequency of said scanning frequency, the output of said oscillator being connected to said electromagnet means.

11. The multicolor oscilloscope of claim 10 wherein said oscillator output is a square wave, said color convergence means including filter means for filtering the square wave output of said oscillator so that an essentially sinusoidal current is coupled to drive said electromagnet means.

12. The multicolor oscilloscope of claim 11 wherein said filter means comprises an independently adjustable filter for each beam of said cathode-ray tube, each filter being adjustable for varying the phase shift of the resultant sinusoidal current and the amplitude of said current.

13. In a multicolor oscilloscope for displaying each of plural input signals in a respectively different color:
   a cathode-ray tube having a screen, plural phosphors on said screen for displaying said different colors when energized by an electron beam, and a deflection coil for producing a magnetic field for deflecting said electron beam
   generating means for generating a wave shape at the frequency at which said beam is to be deflected along one axis of said tube, and
   a capacitor connected in series with said deflection coil, said series circuit coupled to said generating means, said capacitor having a capacitance which resonates with the inductance of said coil at said frequency so that the voltage across said coil is substantially higher than that of the generated wave shape.

14. The multicolor oscilloscope of claim 13 wherein said generating means comprises:
   means for producing a voltage proportional to the current through said deflection coil; and
   amplifier means for amplifying said proportional voltage to produce said wave shape so that the output of said amplifier means is feed back coupled to its input causing the circuit to oscillate at said frequency.

15. The multicolor oscilloscope of claim 14 additionally including:
   means for phase shifting said voltage proportional to the current through said deflection coil, said phase shift causing a change in said oscillation frequency.

16. The multicolor oscilloscope of claim 15 further including:
   phase comparator means for comparing the phase of the voltage proportional to the current through said deflection coil with the phase of a constant frequency signal; and
   means operatively coupling the output of said phase comparator means to said phase shifting means so that the oscillation frequency is changed to avoid drift of the signals displayed on the screen of said cathode-ray tube.

17. An oscilloscope for displaying each of plural input signals in a respectively different color comprising:
   a cathode-ray tube having plural electron guns for producing plural independent electron beams for exciting respectively different colored phosphors on the tube screen;
   vertical deflection means for scanning said beams upwardly and downwardly across said screen;
   plural comparator means respectively responsive to said input signals for comparing the position of one of said beams with the respective one of said input signals and energizing the electron gun of said beam when the beam position corresponds to the magnitude of the input signal.

18. An oscilloscope for displaying each of plural input signals in a respectively different color comprising:
   a cathode-ray tube having a screen which includes phosphors which emit light of a plurality of colors when energized;
   means for scanning said screen for selectively energizing said phosphors;
   plural comparator means responsive to said input signals for simultaneously comparing the position of said scanning means with said input signals for generating a plurality of phosphor illumination dots on said screen; and
   dots of respectively different color being generated for each of said input signals.

19. An oscilloscope for simultaneously displaying first and second waveforms comprising:
   a cathode-ray tube having a screen and means for producing an electron beam for exciting phosphor on said screen;
   deflection means for repetitively and continuously scanning said beam across said screen along one axis;
   means for comparing the position of said beam with said first and second waveforms to (i) generate a phosphor illumination dot on said screen during scan in a given direction along said one axis corresponding to the magnitude of said first signal and (ii) generate a phosphor illumination dot on said screen during scan in the opposite direction along said one axis corresponding to the magnitude of said second signal.

20. A device for simultaneously visually displaying a plurality of input signals comprising:
   a cathode-ray tube having a screen which includes phosphors which emit light of a plurality of colors when energized;

plural means for respectively monitoring the changes in amplitude of said input signals with time; each of said means capable of monitoring a randomly varying signal wave shape;

means for continuously scanning said cathode-ray tube along one axis;

means for deflecting said cathode-ray tube along a second axis; and plural means responsive to said monitoring means and said scanning means for comparing the position of said continuous scanning with the amplitude of each of said input signals during any single deflection along said second axis to energize a different one of said phosphors for each of said input signals at spatial locations dependent upon the amplitudes of said respective input signals.

21. An oscilloscope comprising:

means for continuously scanning a cathode-ray tube along one axis;

means for deflecting said cathode-ray tube along a second axis;

means for comparing the amplitudes of a plurality of input signals with the output of said scanning means during any single deflection along said second axis; and means responsive to said comparing means for generating a plurality of phosphor illumination dots on the face of said oscilloscope, dots of different colors being generated for each of said input signals.

22. In a multielectron-gun cathode-ray tube display system in which the electron beams are deflected along one axis at a constant frequency and wherein an input signal is compared with the electron beam deflection along said one axis:

means for synchronizing said constant frequency to a reference frequency; and means for deflecting said electron beams along an axis perpendicular to said one axis, said means for deflecting being synchronized to said reference frequency.

23. In a display device having a cathode-ray tube in which a deflection coil magnetically deflects the electron beam at a given frequency:

generating means for generating a wave shape at said frequency; and a series resonant circuit comprising:

a capacitor connected in series with said deflection coil, said series resonant circuit coupled to said generating means, said capacitor having a capacitance which resonates with the inductance of said coil at said frequency so that the voltage across said coil is substantially higher than that of the generated wave shape.